United States Patent [19]

Kato

[11] Patent Number: 5,038,049
[45] Date of Patent: Aug. 6, 1991

[54] VERTICAL AXIS WIND POWERED GENERATOR

[76] Inventor: Shuichi Kato, 8740 W. Leutz Rd., Oak Harbor, Ohio 43449

[21] Appl. No.: 581,016

[22] Filed: Sep. 12, 1990

[51] Int. Cl.$^5$ .............................................. F03D 3/04
[52] U.S. Cl. ........................................ 290/55; 290/54; 415/2.1; 415/4.4; 416/9; 416/197 A
[58] Field of Search ............... 290/54, 55; 415/2.1, 415/4.4; 416/9, 197 A

[56] References Cited

U.S. PATENT DOCUMENTS

| | | | |
|---|---|---|---|
| 4,012,163 | 3/1977 | Baumgartner et al. | 415/2.1 |
| 4,350,900 | 9/1982 | Baughman | 290/55 |
| 4,571,152 | 2/1986 | Tatar | 416/197 A |
| 4,764,683 | 8/1988 | Coombes | 290/55 |

Primary Examiner—A. D. Pellinen
Assistant Examiner—Robert L. Hoover
Attorney, Agent, or Firm—Marshall & Melhorn

[57] ABSTRACT

An apparatus for generating electric power from wind includes a base, a pair of upstanding, generally parallel, spaced apart walls rotatably mounted on the base and defining an inlet end and an outlet end for wind, an electric power generator mounted on the base and having an input shaft, and a vertical axis cylindrical rotor having a plurality of wind driven vanes and mounted on the base between the walls, and having an output shaft coupled to rotate the input shafts. A curved inner modulator is rotatably mounted on the base inside said rotor and is selectively movable for controlling wind flow through the rotor. An inlet modulator is rotatably mounted on the base at the inlet end and is selectively movable for controlling wind flow to the rotor. A first generally planar director is pivotally mounted on an outer surface of one of the walls and a second generally planar director is pivotally mounted on an inner surface of the other one of the walls and both directors are responsive to the wind for positioning the inlet end toward the wind.

18 Claims, 2 Drawing Sheets 5,038,049

VERTICAL AXIS WIND POWERED GENERATOR

BACKGROUND OF THE INVENTION

The present invention relates generally to an apparatus for generating electric power and, in particular, to an apparatus responsive to a modulated fluid stream for driving an electric generator.

The kinetic energy of blowing wind has long been converted to mechanical energy. Many different wind driven devices have been proposed and used for taking energy from the wind and transforming it into mechanical or electrical power. For example, windmills are used to operate a pump, grind grain and the like. The best known type of windmill is the typical farm device which is quite satisfactory for its normal intended use of driving a water pump since it can usually provide more water than is needed, even at low efficiency. Such windmills are large, cumbersome, and expensive in relation to the amount of useful work they produce. They have a multitude of very large blades which are directly driven by the relative wind which contacts them, the velocity of which is often so low that the blades can not move the load.

Another common type of windmill is the generally spherical "turbine" type rotor used widely on houses to evacuate hot air from attics and garages. These rotors have multiple blades set at an angle to catch the relative wind at one side and deflect the wind at the other side. Again, they are quite suitable for their intended purpose, but they are actuated by the wind at its normal velocity and produce so little power that they can not drive any appreciable load.

A major drawback of the windmill type devices is that in order to harness enough energy to drive an electric generator, the windmill has to be excessively large and located in an area of high constant wind. The size of the conventional blades results in a constant chopping sound which is distracting and becomes unpleasant and uncomfortable after a short period of time of operation.

Considerable research and development efforts have been expended in attempts to utilize energy generated by wind and water flow. Water wheels and squirrel cage type fins suffer the disadvantage in that only those blades on the side moving with the wind can be utilized while the blades moving in the opposite direction have to be shrouded. As stated above, large propeller type fins rotating in a vertical plane have been tested and tried for the production of energy, but they too suffer a number of disadvantages. First, for practical purposes, they must be of considerable diameter for effective energy production. This results in tremendous cylindrical forces which may cause vibration and even twisting or crystallization of metal propeller blades and/or destruction of the supporting tower. Even in the absence of damage, large propellers tend to be noisy and are, therefore, objectionable in a community. Moreover, the large propellers require high towers to provide ample clearance under the propeller tips and such towers are commonly deemed unsightly and objectionable for community use.

Various types of wind-propelled devices have been proposed, including windmills, paddle constructions, and propeller type devices, which have operated satisfactorily under ordinary wind conditions. However, some devices, while operating satisfactory under moderate wind conditions, are not able to withstand winds at high velocity. Devices which are moderately efficient at winds of a certain level, may have efficiencies which drop off sharply at velocities below or above that level. To produce optimum results, wind driven devices should be rapidly responsive to changes in wind direction and velocity, characteristics not commonly shared by prior art devices. Optimally, and especially with electrical generating wind-driven devices, such devices should be sensitive to load requirements and speed limitation.

Examples of fluid flow powered electrical generators are shown in:

U.S. Pat. No. 4,350,900, issued to Baughman, discloses a wind or water driven machine having a squirrel cage rotor with a vertical axis of rotation. A louver or damper is utilized to control the amount of wind flowing to the rotor.

U.S. Pat. No. 4,609,827, issued to Nepple, discloses a vertical axis wind powered generator having airfoil shaped vanes.

U.S. Pat. No. 4,764,683, issued to Coombes, discloses a wind powered generator having nacelles for directing the wind stream against the rotor vanes.

SUMMARY OF THE INVENTION

The present invention concerns an apparatus for generating electric power from wind. The apparatus includes a base, a pair of upstanding, generally parallel, spaced apart walls mounted on the base and defining an inlet end and an outlet end for wind, means for generating electric power mounted on the base and having an input shaft, and a vertical axis cylindrical rotor mounted on the base between the walls and having an output shaft coupled to rotate the input shaft, the rotor having a plurality of vertically extending wind driven vanes.

An inner modulator is rotatably mounted on the base inside the rotor and is selectively movable for controlling wind flow through the rotor. An inlet modulator is rotatably mounted on the base at the inlet end and is selectively movable for controlling wind flow to the rotor. An inlet modulator is positioned at the inlet end for selectively controlling the flow of air to the rotor and an inner modulator is positioned inside the rotor for selectively controlling the flow of air through the rotor.

In some applications, the walls also are rotatable on the base for maintaining the inlet end facing the source of the wind. A pair of spring loaded planar directors are provided for presenting a surface area to the wind whereby the walls are rotated on the base such that the inlet end faces into the wind. One of the directors is attached to an outer surface of one of the walls at the outlet end and the other director is attached to an inner surface of the other wall at the outlet end.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
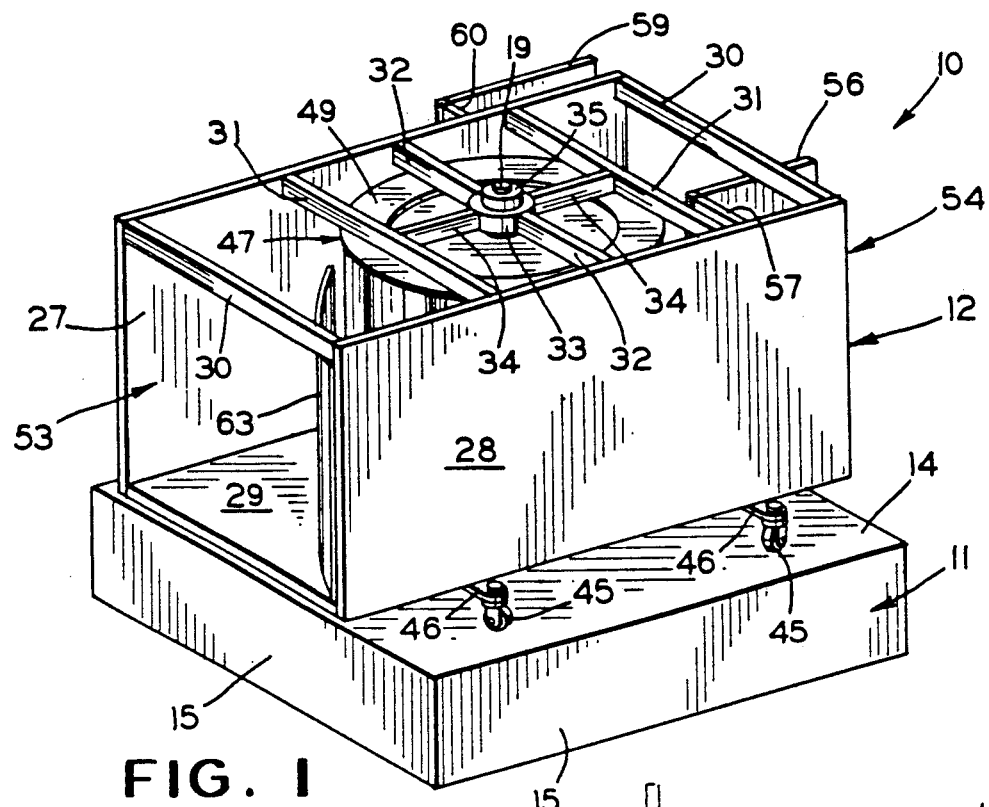
FIG. 1 is a perspective view of an electric power generating apparatus in accordance with the present invention.
Figure 2:
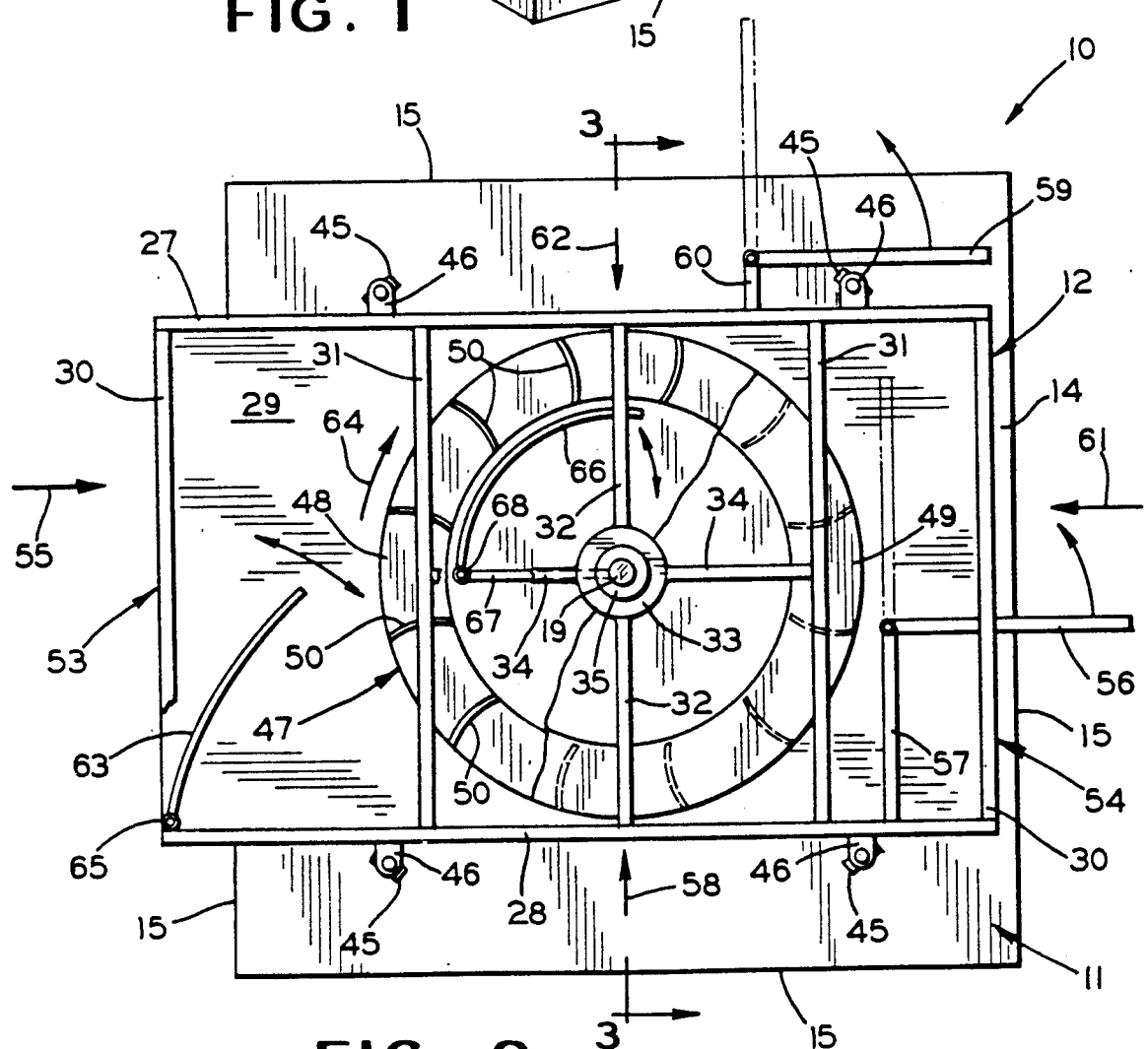
FIG. 2 is top plan view of the apparatus in FIG. 1.
Figure 3:
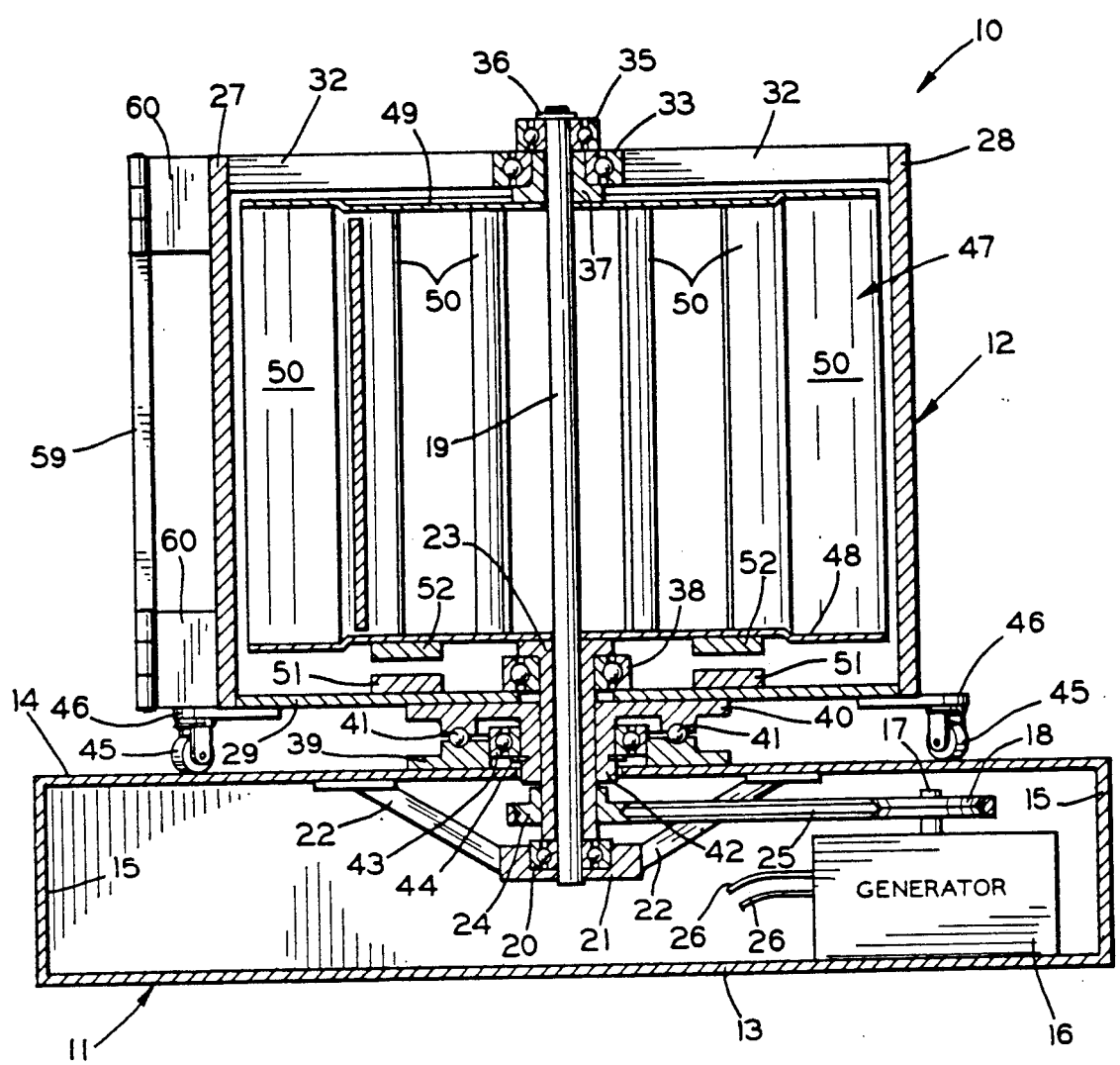
FIG. 3 is a cross sectional view of the apparatus taken along the line 3—3 in FIG. 2.

In the FIGS. 1 through 3, there is shown an electrical power generating, wind powered apparatus 10. The apparatus 10 includes a generally horizontally extending base 11 for supporting the apparatus on the ground, on top of a building, on top of a tower, or on any other suitable surface. Supported on an upper surface of the base 11 is rotor and modulator assembly 12 which is responsive to the wind for converting mechanical energy into electrical energy.

The base 11 can be formed as a hollow box having a pair of generally horizontally extending, spaced apart planar walls, a bottom wall 13 and a top wall 14, attached to each other along corresponding edges by a plurality of generally vertically extending planar side walls 15. Mounted inside the base 11, on the bottom wall 13, is an electrical generator 16 having a vertically upwardly extending input shaft 17 attached to a driven pulley 18.

The rotor and modulator assembly 12 includes a generally vertically extending inner modulator shaft 19, a lower end of which extends through an aperture formed in the top wall 14. The lower end of the shaft 19 extends through and is rotatably supported in a modulator shaft lower bearing 20 which is attached to a hub 21. The hub 21 is suspended from the inside surface of the top wall 14 by a plurality of angularly disposed brackets 22 each of which has one end attached to the hub 21 and an opposite end attached to the top wall 14.

Above the bearing 20, the lower end of the shaft 19 extends upwardly through the center of a hollow lower rotor shaft 23. A lower end of the rotor shaft 23 extends through the aperture formed in the top wall 14 and has a drive pulley 24 affixed thereto located inside the base 11. Mounted on the drive pulley 24 and the driven pulley 18 is a suitable power transmission device such as a V-belt 25. As the drive shaft 23 is rotated in response to the wind, in the manner discussed below, the drive pulley 24 rotates the driven pulley 18 through the V-belt 25 to rotate the input shaft 17 thereby causing the generator 16 to generate electrical power at a pair of output lines 26.

The rotor and modulator assembly 12 includes a pair of upstanding, generally parallel, spaced apart side walls 27 and 28. A lower edge of each of the side walls 27 and 28 is attached to an opposite edge of a generally horizontally extending bottom wall 29 spaced above an upper surface of the top wall 14 of the base 11. The upper edges of the side walls 27 and 28 are maintained in a fixed spaced relationship by a plurality of cross beams including a pair of end beams 30 extending between opposite upper corners, a pair of spaced apart middle beams 31 extending between opposite upper edges of the side walls 27 and 28 between the end beams 30, and a pair of center beams 32 each extending between an upper edge of an associated one of the side walls 27 and 28 and an upper rotor shaft bearing 33. A pair of tie beams 34 are connected between the upper rotor shaft bearing 33 and a center point of associated ones of the middle beams 31.

A modulator shaft upper bearing 35 is mounted on top of the upper rotor shaft bearing 33. The upper end of the modulator shaft 19 extends through and is rotatably supported in the bearing 35. The upper end of the shaft 19 can be threaded to receive a threaded fastener 36 to prevent downward movement of the shaft 19 along its longitudinal axis. The upper end of the shaft 19 also extends through the center of a hollow upper rotor shaft 37. The upper rotor shaft 37 is formed with a smaller diameter portion which is rotatably mounted in the upper rotor shaft bearing 33 and a larger diameter flange portion which abuts the lower surface of the bearing 33. The lower rotor shaft 23 similarly has a smaller diameter portion rotatably mounted in a lower rotor shaft bearing 38. The bearing 38 is attached to an upper surface of the bottom wall 29 and abuts a larger diameter flanged portion of the shaft 23.

The rotor and modulator assembly 12 is supported on the base 11 by a combination pilot and thrust bearing. The thrust bearing includes a lower race 39 mounted on the upper surface of the top wall 14 of the base 11. An upper race 40 of the thrust bearing is attached to a lower surface of the bottom wall 29 and a plurality of ball bearings 41 cooperate with the lower race 39 and the upper race 40 to rotatably support the rotor and modulator assembly 12 on the upper surface of the base 11. The upper race 40 has a hub portion 42 which extends downwardly through a central aperture formed in the lower race 39 and the aperture formed in the top wall 14. Located between an outer surface of the hub 42 and a facing inner surface of the aperture formed in the lower race 39 is a pilot bearing 43 which assists in centering the upper race 40 with respect to the lower race 39 and the base 11. The pilot bearing 43 is maintained in position along the longitudinal axis of the hub 42 by any suitable means such as being supported by a snap ring 44 engaging an annular groove formed in an outer surface of the hub 42. The rotor and modulator assembly 12 can be further stabilized by a plurality of caster assemblies 45 each of which is attached to the bottom wall 29 by an associated generally horizontally extending bracket 46. The caster assemblies 45 engage an upper surface of the top wall 14 to assist in rotation of the assembly 12 about the longitudinal axis of the shaft 19.

Located between the side walls 27 and 28 is a vertical axis rotor assembly 47. The rotor assembly 47 includes a pair of generally circular, horizontally extending, planar end plates, a lower end plate 48 and an upper end plate 49. The lower end plate 48 is supported by and attached to the flanged upper end of the lower rotor shaft 23. The upper end plate 49 is attached to the lower flanged end of the upper rotor shaft 37. Extending between the facing surfaces of the lower end plate 48 and the upper end plate 49 are a plurality of curved vanes 50. The vanes 50 are generally equally spaced about the periphery of the plates 48 and 49 and are oriented in the same direction, each being curved about a vertical longitudinal axis and extending generally toward the center of the rotor assembly 47. In order to reduce the rotational friction of the rotor assembly 47, magnets 51 can be mounted on an upper surface of the bottom wall 29 and magnets 52 can be mounted on a lower surface of the lower end plate 48. The magnets 51 and 52 can be positioned adjacent one another and magnetized to produce a repelling force tending to lift the rotor assembly 47 thereby relieving some of the load on the lower rotor shaft bearing 38.

The rotor and modulator assembly 12 is constructed to be self centering toward the direction from which the wind is blowing. The assembly 12 has an inlet end 53 and an outlet end 54. The inlet end 53 is defined by a longer horizontal expanse of the side walls 27 and 28 and the bottom wall 29 from the inner modulator shaft 19 than in a direction toward the outlet end 54.

If the wind is blowing from the direction indicated by an arrow 55 in FIG. 2, the side walls 27 and 28 will tend to act as weather vanes and maintain the inlet end 53 facing the direction from which the wind is blowing. An end director panel 56 is located at the outlet end 54 of the assembly 12. The panel 56 extends in a generally vertical direction and has one vertical edge pivotally hinged to a bracket 57 affixed to and extending toward the side wall 27 from the inner surface of the side wall 28 adjacent the outlet end 54. The panel 56 is spring loaded at the hinge point to the position shown in solid line in the absence of any external force. The panel 56 extends out of the outlet end 54 a distance sufficient to provide additional surface area to be acted upon by wind blowing from the direction of an arrow 58. Thus, the surface area of the end director panel 56 plus the surface area of the side wall 28 to the right of the inner modulator shaft 19 is greater than the surface of the side wall 28 to the left of the shaft 19 whereby the wind tends to rotate the assembly 12 in a counterclockwise direction such that the inlet 53 faces into the direction of the wind indicated by the arrow 58.

The rotor and modulator assembly 12 is also provided with a side director panel 59 which has one end pivotally hinged to a pair of brackets 60 extending outwardly from the outer surface of the side wall 27 adjacent the outlet end 54. When the wind is blowing from a direction indicated by an arrow 61 toward the outlet end 54, the end director panel 56 and the side director panel 59 will tend rotate about their pivot points to the fully open positions shown in phantom in FIG. 2. Thus, the panels 54 and 56 will present a relatively large surface area to the wind which surface area is almost completely located to the left of the modulator shaft 19. Thus, the assembly 12 will tend to rotate in a counterclockwise direction until the inlet end 53 faces into the wind indicated by the arrow 61. If the wind is blowing from a direction indicated by an arrow 62, the end panel 56 will provide the surface area required to rotate the assembly in a clockwise direction until the inlet end 53 faces into the wind.

The rotor and modulator assembly 12 is provided with a pair of modulators for directing the wind from the inlet end 53 through the rotor assembly 47 and to the outlet end 54. A generally vertically extending inlet modulator 63 is pivotally mounted along one vertical edge thereof at the inlet end of the side wall 28. Wind blowing from the direction of the arrow 55 in FIG. 2 will rotate the rotor assembly 47 in a clockwise direction as indicated by arrows 64. If the air flow were uniform across the space between the side walls 27 and 28, considerable resistance to rotation would be offered by the portion of the rotor assembly 47 closer to the side wall 28 as it rotated against the direction of air flow. Thus, the position of the inlet modulator 63 can be selectively varied about the pivot point 65 to block air flow to that portion of the rotor assembly 47 rotating toward the direction of the air flow and to divert the total air flow at the inlet end 53 toward that side of the rotor assembly 47 which is being acted upon by the air flow to continue the rotor in rotation.

The rotor and modulator assembly 12 is also provided with an inner modulator 66. The inner modulator 66 is a generally vertically extending curved panel positioned adjacent the inner vertical edges of the vanes 50 extending between the lower end plate 48 and the upper end plate 49. One vertical edge of the inner modulator 66 is pivotally attached to a bracket 67 which in turn is attached to the inner modulator shaft 19. Thus, the inner modulator 66 can move toward and away from the modulator shaft 19 about the pivot point 68. The bracket 67 can be rotated with the shaft 19 to position the pivot point at any selected location about the interior of the rotor assembly 47. The inner modulator 66 can be utilized to block air flow between the vanes 50 and instead direct the air flow perpendicularly against the curved surfaces of the vanes 50. Each of the modulators 63 and 66 can be set in position manually or automatically actuated (not shown) in response to conditions such as wind speed or output power required.

Figure 4:
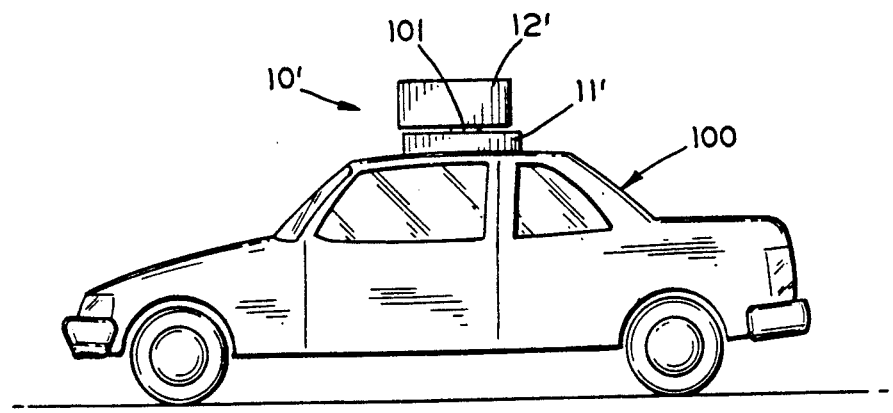
FIG. 4 is a side elevation view of an alternate embodiment of the apparatus shown in FIG. 1 mounted on a vehicle.

The present invention also can be utilized with a stationary rotor and modulator assembly mounted on an object movable through a fluid. For example, in the FIG. 4 there is shown an automobile 100 having a vertical axis wind powered generator apparatus 10' mounted on the roof. The apparatus is similar to the apparatus 10, having a rotor and modulator assembly 12' mounted on a base 11'. The base 11' can be similar to the base 11 including the electrical generator 16 (not shown). The rotor and modulator assembly 12' can be similar to the assembly 12 except that there is no requirement for rotation on the top of the base 11' since an inlet end is always facing the direction of travel of the object thereby receiving the air flow. Therefore, the casters 45 and the brackets 46, as well as the combination pilot and thrust bearing, can be eliminated. The rotor and modulator assembly 12' is fixedly mounted on the base 11' by a hollow support tube 101 through which the inner modulator shaft 19 (not shown) and the lower rotor shaft 23 extend. Such and apparatus can be mounted on any type of land, water or air vehicle capable of speeds sufficient to operate the rotor and modulator assembly 12'. Furthermore, the apparatus according to the present invention can be used in series by positioning an inlet of a second such device adjacent the outlet of a first such device.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for generating electric power from wind comprising:

a base;

a pair of upstanding, generally parallel, spaced apart walls mounted on said base and defining an inlet end and an outlet end for wind;

means for generating electric power mounted on said base and having an input shaft;

a vertical axis cylindrical rotor having a plurality of wind driven vanes, and mounted on said base between said walls, and having an output shaft coupled to rotate said input shaft;

an inner modulator rotatably mounted on said base inside said rotor and selectively movable for controlling wind flow through said rotor; and an inlet modulator rotatably mounted on said base at said inlet end and selectively movable for controlling wind flow to said rotor.

2. The apparatus according to claim 1 wherein said walls are rotatably mounted on said base for positioning said inlet end toward the wind.

3. The apparatus according to claim 2 including a generally planar director pivotally mounted on an outer surface of one of said walls and responsive to the wind for positioning said inlet end toward the wind.

4. The apparatus according to claim 3 wherein said planar director presents a surface area to the wind sufficient to cause said walls to rotate about said rotor whereby said inlet end faces into the wind.

5. The apparatus according to claim 2 including a generally planar director pivotally mounted on an inner surface of one of said walls and responsive to the wind for positioning said inlet end toward the wind.

6. The apparatus according to claim 5 wherein said planar director presents a surface area to the wind sufficient to cause said walls to rotate about said rotor whereby said inlet end faces into the wind.

7. The apparatus according to claim 2 including a first generally planar director pivotally mounted on an outer surface of one of said walls and responsive to the wind for positioning said inlet end toward the wind and a second generally planar director pivotally mounted on an inner surface of the other one of said walls and responsive to the wind for positioning said inlet end toward the wind.

8. The apparatus according to claim 7 wherein each of said first and second planar director presents a surface area to the wind sufficient to cause said walls to rotate about said rotor whereby said inlet end faces into the wind.

9. The apparatus according to claim 1 wherein said walls are each attached along a bottom edge to an associated edge of a bottom wall.

10. The apparatus according to claim 9 including first magnetic means attached to said rotor and second magnetic means attached to said bottom wall, said first and second magnetic means mutually repelling for supporting said rotor.

11. The apparatus according to claim 1 wherein said inner modulator includes a generally vertically extending, curved planar surface positioned adjacent an inner edge of said vanes and attached by a bracket to an inner modulator shaft rotatably supported on said base and extending through a center of rotation of said rotor.

12. The apparatus according to claim 1 wherein said inlet modulator includes a generally vertically extending, curved planar surface pivotally attached to an inner surface of one of said walls adjacent the inlet end.

13. An apparatus for generating electric power from wind comprising:
a base;
a pair of upstanding, generally parallel, spaced apart walls rotatably mounted on said base and defining an inlet end and an outlet end for wind;
means for generating electric power mounted on said base and having an input shaft;
a vertical axis cylindrical rotor having a plurality of wind driven vanes, and mounted on said base between said walls, and having an output shaft coupled to rotate said input shaft;
an inner modulator rotatably mounted on said base inside said rotor and selectively movable for controlling wind flow through said rotor; and
an inlet modulator rotatably mounted on said base at said inlet end and selectively movable for controlling wind flow to said rotor.

14. The apparatus according to claim 13 including a generally planar director pivotally mounted on an outer surface of one of said walls and responsive to the wind for positioning said inlet end toward the wind.

15. The apparatus according to claim 13 including a generally planar director pivotally mounted on an inner surface of one of said walls and responsive to the wind for positioning said inlet end toward the wind.

16. The apparatus according to claim 13 including a first generally planar director pivotally mounted on an outer surface of one of said walls and responsive to the wind for positioning said inlet end toward the wind and a second generally planar director pivotally mounted on an inner surface of the other one of said walls and responsive to the wind for positioning said inlet end toward the wind, said walls being longer from a center of rotation of said rotor to said inlet end than from the center of rotation to said outlet end.

17. An apparatus for generating electric power from wind comprising:
a base;
a pair of upstanding, generally parallel, spaced apart walls rotatably mounted on said base and defining an inlet end and an outlet end for wind;
means for generating electric power mounted on said base and having an input shaft;
a vertical axis cylindrical rotor having a plurality of wind driven vanes, and mounted on said base between said walls, and having an output shaft coupled to rotate said input shaft;
an inner modulator rotatably mounted on said base inside said rotor and selectively movable for controlling wind flow through said rotor, said inner modulator including a generally vertically extending, curved planar surface positioned adjacent an inner edge of said vanes and attached by a bracket to an inner modulator shaft rotatably supported on said base and extending through a center of rotation of said rotor; and
an inlet modulator rotatably mounted on said base at said inlet end and selectively movable for controlling wind flow to said rotor, said inlet modulator including a generally vertically extending, curved planar surface pivotally attached to an inner surface of one of said walls adjacent the inlet end.

18. The apparatus according to claim 17 including a first generally planar director pivotally mounted on an outer surface of one of said walls and responsive to the wind for positioning said inlet end toward the wind and a second generally planar director pivotally mounted on an inner surface of the other one of said walls and responsive to the wind for positioning said inlet end toward the wind.

* * * * *